Dec. 1, 1964 C. F. ERIKSON 3,159,081
TOOL ADAPTER
Filed Feb. 6, 1962 2 Sheets-Sheet 1

INVENTOR.
Carl F. Erikson,
BY Hofgren, Brady,
Wegner, Allen & Stellman
Attys.

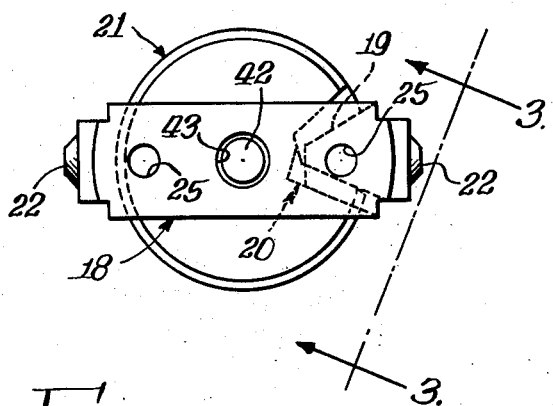
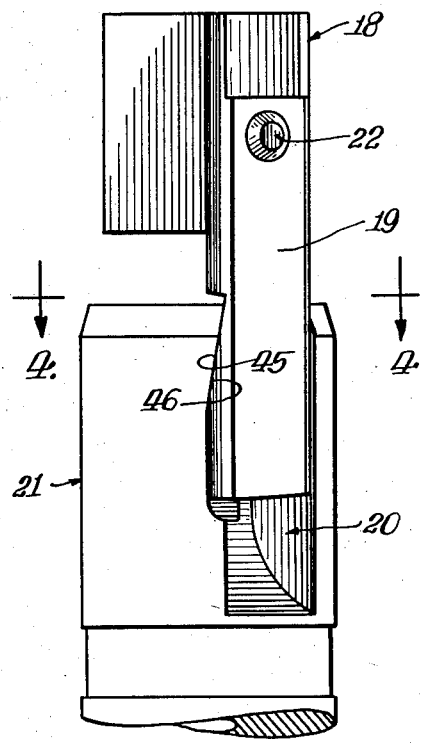
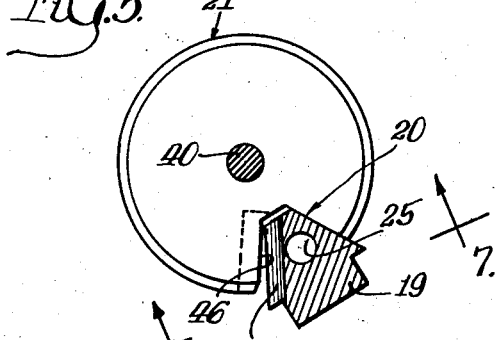
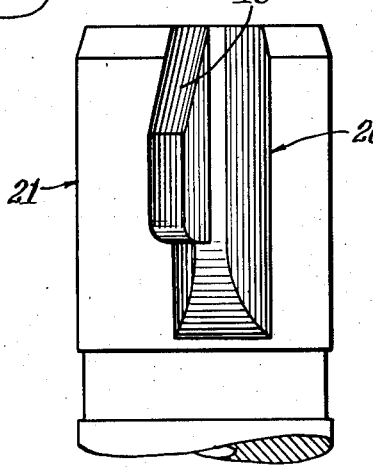
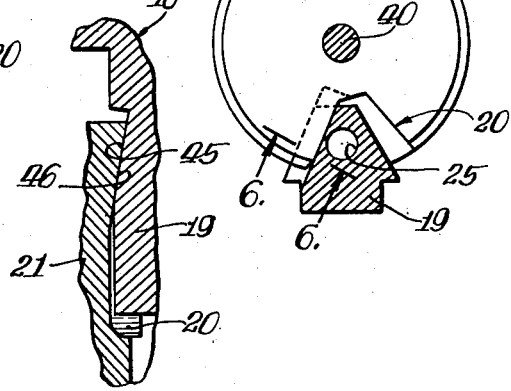

United States Patent Office 3,159,081
Patented Dec. 1, 1964

3,159,081
TOOL ADAPTER
Carl F. Erikson, Belvidere, Ill., assignor to Sundstrand Corporation, a corporation of Illinois
Filed Feb. 6, 1962, Ser. No. 171,490
5 Claims. (Cl. 90—11)

This invention relates to machine tools and more particularly to a tool mounting assembly in machine tools.

The primary object of this invention is to provide a new and improved tool mounting assembly in a machine tool, and more particularly in a machine tool spindle assembly.

Machine tools for mounting and driving cutters are well understood in the art. In one exemplification a rotating spindle mounts an expanding collet which receives a tool mounting adapter, and the collet is contracted for holding the adapter with a tight torque transmitting grip. Effective torque transmission between the spindle and adapter is further facilitated by keying the adapter to the spindle. However, some cutters, for example steep helix cutters such as various end mills, exert a strong axial pull on the adapter and this axial pull tends to draw the adapter out of the collet and spindle.

An important object of this invention is the provision of a new and improved mounting for a tool in a spindle, such that the tool is effectively held against axial movement with respect to the spindle.

Another object is the provision of a new and improved tool mounting releasably telescoped in a rotating spindle and having means for effectively preventing axial movement out of the spindle.

A further object is the provision of a new and improved keying assembly.

A still further object is the provision of a new and improved keying assembly for effectively preventing rotational and axial displacement between a tool holding adapter and a rotating spindle telescopically and removably mounting the adapter. A related object is provision of such a keying assembly having cooperating abutting surfaces transverse to the direction of rotation of the spindle, and inclined in the direction of rotation and toward the open end of the spindle with respect to a plane normal to the axis of rotation of the spindle.

Other objects and advantages will become readily apparent from the following detailed description taken in connection with the accompanying drawings, in which;

FIGURE 2 is a top view of the driver and adapter shown in FIGURE 1, with the remainder of the head removed for clearer illustration;

FIGURE 3 is an elevational view taken generally along the line 3—3 of FIGURE 2;

FIGURE 4 is a horizontal section taken generally along the line 4—4 of FIGURE 3;

FIGURE 5 is a horizontal section, generally similar to FIGURE 4, but showing the parts in unlocked relationship;

FIGURE 6 is a fragmentary section taken generally along the line 6—6 of FIGURE 4; and FIGURE 7 is a fragmentary elevational view taken generally along the line 7—7 of FIGURE 5, but with the driver removed for clearer illustration.

Figure 1:
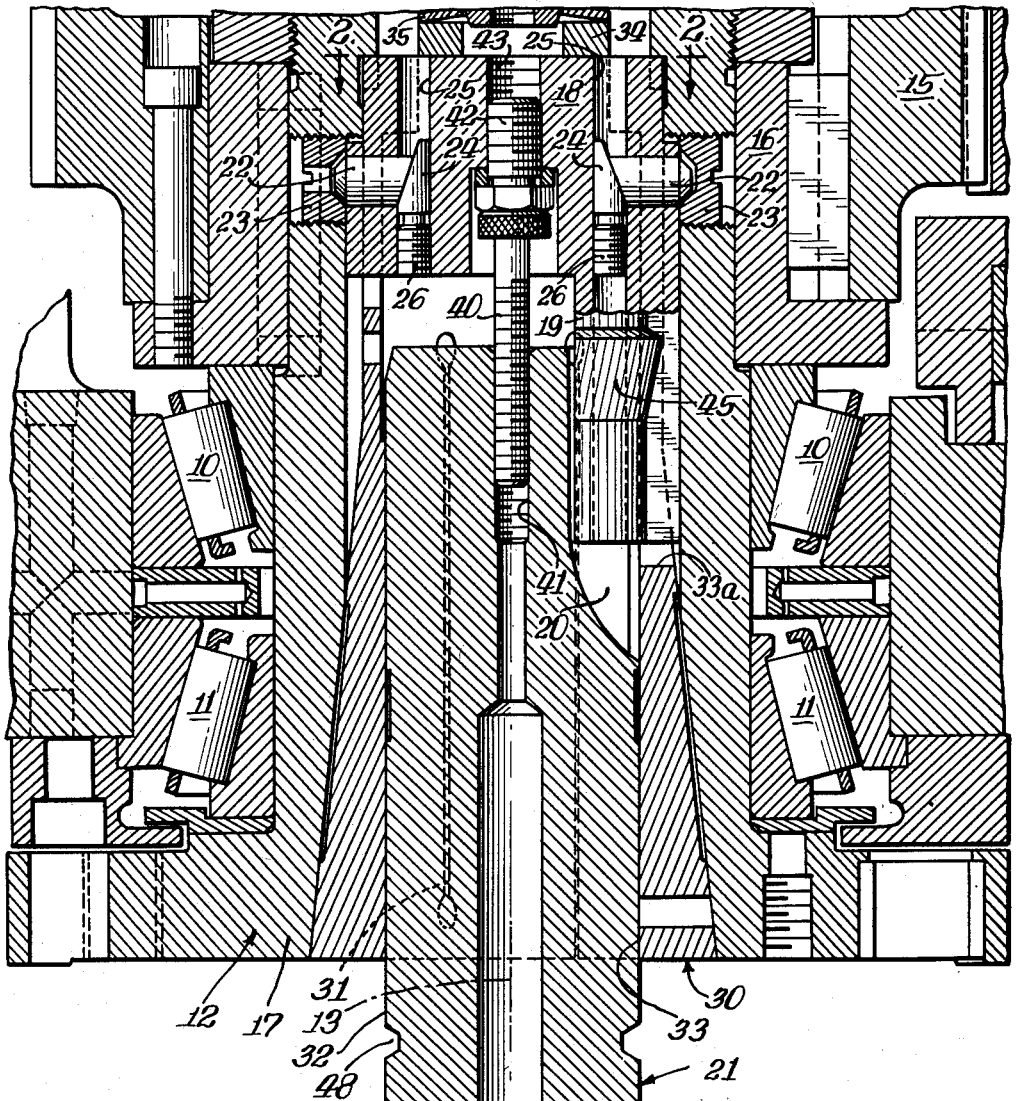
FIGURE 1 is a fragmentary longitudinal section of a machine tool head illustrating a preferred embodiment of a tool mounting and driving assembly including a spindle having a driver and operatively associated in locked relationship with a tool holding adapter.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

The invention, in brief, is directed to a tool mounting assembly for a machine tool head, and more particularly for a machine tool rotating spindle head. In the illustrated embodiment a tool has an adapter mounted in the spindle. Cooperating means on the adapter and spindle releasably hold the adapter against rotational and axial displacement with respect to the spindle during cutting operation of a tool mounted in the adapter. In the illustrated embodiment these means take the form of cooperating keying surfaces on the spindle and adapter, and is such that the adapter may be telescopically inserted into and removed from the spindle in keeping with common machine tool practice.

Referring to FIGURE 1 of the drawings, a machine tool spindle head generally of the type described and shown in U.S. patent application of Swanson and Erickson, Serial No. 59,236, filed September 29, 1960, and now Patent No. 3,136,563 for a "Tool Supporting Adapter" includes a suitable frame. This frame carries bearing assemblies 10 and 11 which mount a spindle 12 for rotation about its longitudinal axis indicated by reference numeral 13. Spindle 12 is rotated by a suitable drive here shown in the form of a gear train including a gear 15 mounted on the frame and driving a gear 16 secured to a spindle casing 17.

Spindle 12 includes a driver 18 having a key 19 extending in the direction of axis 13 and received in a keyway 20 of a tool holding adapter 21. Spindle casing 17 and spindle driver 18 are releasably interlocked for rotation together by diametrically opposed pins 22 telescoped in radial bores in the driver and urged outwardly, into firm seated engagement with seats 23 threadedly secured in casing 17, by wedges 24 each telescoped in a bore 25 parallel to axis 13. Wedges 24 have wedging surfaces which cooperate with wedging surfaces on the inner ends of pins 22 for urging the pins against seats 23 as set screws 26 are screwed inwardly in threaded bores 25 in driver 18.

A suitable expanding collet 30 is telescopically received in an open ended bore in spindle casing 17. Casing 17 and collet 30 have cooperating means including frustoconical surfaces converging inwardly from the open end of the casing bore, and the collet has longitudinally extending slots 31, so that as the collet is drawn into the casing bore it is contracted inwardly to engage, with a tight torque transmitting grip, an adapter cylindrical shank 32 which is telescopically and removably received in a cylindrical bore 33 of the collet. Collet 30 has an opening 33a for the passage of key 19 into collet bore 33. As is more fully described in the aforementioned patent application, suitable means, including a ring 34 which is seated on driver 18 and receives spring washers 35, normally urges collet 30 inwardly of the spindle to clamp adapter 21 in the spindle and more particularly in collet bore 33. Other means, also described in the aforementioned patent application, are provided for releasably telescoping collet 30 outwardly in the spindle to release the adapter.

A cutting tool may be releasably held in an adapter socket 38 in any suitable manner, as by radially extending set screws 39 threaded in bores in the adapter, and the overall extension of the tool from the spindle may be adjusted by an adjusting screw 40 threadedly received in a threaded bore 41 in the inner end of adapter 21 and seated against the head of a screw 42 threadedly received in a threaded bore 43 of driver 18, for operatively seating the adapter axially in the spindle. Telescopic insertion and removal of adapter 21 from spindle 12 may be suitably effected by handling mechanism fully described in the aforementioned patent application and having a gripping portion releasably received in a groove 48 in the outer end of adapter shank 32.

The structure previously described is in keeping with the construction described in the aforementioned patent application, and reference may be had thereto.

One or more suitable type keys 19 may be provided, and in the illustrated embodiment a single key is generally triangular with a flattened vertex radially aligned with axis 13 and sides diverging outwardly from this vertex and each defining an angle of about 30° with a centered radius.

When a steep helix cutter, such as an end mill tool, is mounted in adapter socket 38 there is often a strong force exerted by the tool in an axial direction tending to pull adapter 21 out of collet 30. Cooperating means on the spindle and adapter are provided for releasably interlocking these parts against relative axial displacement. Multiple keys and keyways, or helical splines may be provided, and in the preferred illustrated embodiment these means take the form of cooperating portions of spindle key 19 and adapter keyway 20 which effectively prevent movement of the adapter out of the spindle during operation, along with previously described screws 40 and 42. This portion of the key is defined by a surface 45 on one of the previously noted key sides, and the cooperating portion of the keyway is defined by a cooperating surface 46 of a keyway side. Surfaces 45 and 46 abut during cutting operation as spindle 12 is rotated in one direction, and these surfaces are disposed as illustrated in the drawings. As shown in the drawings, cooperating abutting surfaces 45 and 46 on the key 19 and adapter 21, respectively, are transversed to the direction of rotation of spindle 12; and with respect to a plane normal to the axis of rotation of the spindle these surfaces are inclined in the direction of rotation of the spindle during cutting, and toward the spindle open end, and more particularly these surfaces are inclined with respect to the direction of telescopic movement of the adapter into the spindle at an angle of about 15°.

As mentioned previously, adapter 21 is releasably held in collet 30 and may be telescoped into and out of the collet in conventional manner when the collet is expanded by movement outwardly in spindle 12. Thus to permit normal insertion and removal of the adapter, keyway 20 in adapter 21 is sufficiently wide in the circumferential direction of shank 32 to permit the keyway to be telescoped over key 19. Surface 45 of key 19 defines a side of an undercut notch in the key, and surface 46 of the keyway extends outwardly. After the key has been fully telescoped into the keyway, rotation of the spindle relative to adapter 21, causes the adapter to rotate slightly in collet 30 until surfaces 45 and 46 abut, whereupon the inclination of these cooperating surfaces, as shown in the drawings, interlock adapter 21 and spindle 13 to effectively prevent axial displacement of adapter 21 outwardly of the spindle. Upon release of the torque transmitting grip of collet 30 on adapter shank 32 the adapter may be rotated slightly and telescoped out of the collet and spindle.

I claim:

1. In a mounting for a rotating tool which exerts an axial pull on the mounting during operation, the combination comprising: a spindle rotatable about an axis and having an open ended axial bore and a detachable driver, said driver having a key extending in an axial direction into said bore, means for rotating said spindle about its axis in one direction during operation of the tool, an adapter telescopically and removably received in said bore, coacting means on said spindle and adapter providing an adjustable positive stop for movement of the adapter inwardly of the spindle, said adapter having an axially extending keyway receiving said key, said keyway being defined by a side, and cooperating abutting surfaces on said key and keyway side for releasably interlocking said adapter and spindle against relative axial displacement outwardly of the spindle bore, said surfaces being transverse to the direction of rotation of said spindle and inclined with respect to the direction of telescopic movement of the adapter into the spindle.

2. In a tool mounting for a machine tool, the combination comprising: a spindle, an adapter slidably telescoped and removably received in said spindle, coacting means on said spindle and adapter providing an adjustable positive stop for movement of the adapter inwardly of the spindle, and means including cooperating abutting surfaces of said spindle and adapter releasably interlocking said adapter and spindle against displacement in the direction of telescopic movement between the adapter and spindle, said surfaces being inclined to said direction of telescopic movement.

3. In a tool mounting for a machine tool, the combination comprising: a spindle, means for rotating said spindle in one direction during operation, an adapter rotatably telescoped and removably received by said spindle, coacting means on said spindle and adapter providing an adjustable positive stop for movement of the adapter inwardly of the spindle, and cooperating surfaces on said spindle and adapter movable into abutting relationship for releasably interlocking said adapter against axial displacement in a direction of telescopic movement with the adapter surface inclined to the longitudinal axis of the adapter, said surfaces being positioned in said abutting relationship upon relative rotation of said adapter and spindle when said adapter is received by said spindle.

4. In a mounting for a rotating tool which exerts an axial pull on the mounting during operation, the combination comprising: a head having a rotatably mounted spindle with an open ended bore, means for rotating said spindle in one direction during operation, a tool holding adapter rotatably telescoped and removably received in said bore, means operatively and removably seating the adapter axially in the spindle bore at various adjustable depths, cooperating surfaces on said spindle and adapter movable into abutting relationship for releasably interlocking said adapter against axial movement outwardly of the spindle open end, said surfaces being transverse to the direction of rotation of said spindle and inclined with respect to a plane normal to the axis of rotation of said spindle in said direction of rotation and toward the spindle open end, said surfaces being positioned in said abutting relationship upon rotation of said adapter relative to said spindle opposite said one direction when said adapter is axially seated in the spindle bore and being elongate but of different lengths whereby abutment occurs within a range of depth positions of the adapter in the spindle, and means for clamping the adapter in the spindle bore with the adapter operatively axially seated and said surfaces in said abutting relationship.

5. In a mounting for a rotating tool which exerts an axial pull on the mounting during operation, the combination comprising: a head having a rotatably mounted spindle with an open ended bore and a detachable driver, said driver having a key extending in an axial direction into said spindle bore, an expanding collet telescopically received in the spindle bore and having a bore and an opening for the passage of said key into the collet bore, means for rotating said spindle in one direction during operation, a tool holding adapter telescopically and removably received in said collet bore, said adapter having an axially extending keyway telescopically and removably receiving said key and an adjustable tool stop extending from an inner end of said adapter for positively controlling the innermost position of the adapter, means comprising cooperating surfaces on said spindle and collet and responsive to movement of the collet into the spindle bore to contract and hold the collet in torque transmitting engagement with said adapter, and cooperating abutting surfaces on said key and adapter keyway for releasably interlocking said adapter and spindle against relative axial displacement outwardly of the spindle open end, said surfaces being transverse to said one direction of rotation of said spindle and inclined with respect to a plane normal to the axis of rotation of said spindle in said direction of rotation and toward the spindle open end.

References Cited by the Examiner

UNITED STATES PATENTS

| | | | |
|---|---|---|---|
| 766,747 | 8/04 | Vauclain | 77—71 |
| 1,034,724 | 8/12 | Mueller | 77—71 |
| 2,039,855 | 5/36 | Stone. | |
| 2,387,339 | 10/45 | Meyer | 77—71 |
| 2,399,425 | 4/46 | Bozarth. | |
| 2,678,826 | 5/54 | Nick | 77—60 X |

FOREIGN PATENTS

| | | |
|---|---|---|
| 2,738 | 1911 | Great Britain. |
| 16,727 | 1910 | Great Britain. |

WILLIAM W. DYER, JR., *Primary Examiner.*